United States Patent
Finke et al.

(10) Patent No.: US 7,860,841 B2
(45) Date of Patent: Dec. 28, 2010

(54) METHOD AND APPARATUS TO SUPPORT MASS CHANGES TO BUSINESS OBJECTS IN AN INTEGRATED COMPUTER SYSTEM

(75) Inventors: Sabine Finke, Karlsruhe (DE); Klaus Kohlmaier, Leimen (DE)

(73) Assignee: SAP AG, Walldorf (DE)

( * ) Notice: Subject to any disclaimer, the term of this patent is extended or adjusted under 35 U.S.C. 154(b) by 287 days.

(21) Appl. No.: 11/221,712

(22) Filed: Sep. 9, 2005

(65) Prior Publication Data

US 2007/0061293 A1 Mar. 15, 2007

(51) Int. Cl.
*G06F 7/00* (2006.01)
(52) U.S. Cl. .................................... 707/674; 707/687
(58) Field of Classification Search .......... 707/687, 707/674
See application file for complete search history.

(56) References Cited

U.S. PATENT DOCUMENTS

| | | | | |
|---|---|---|---|---|
| 7,072,047 B2* | 7/2006 | Westphal et al. | ............. | 356/497 |
| 7,103,434 B2* | 9/2006 | Chernyak et al. | ............. | 700/98 |
| 7,120,638 B1* | 10/2006 | Cesare et al. | ............... | 707/101 |
| 7,200,585 B2* | 4/2007 | Kinno et al. | ........................ | 1/1 |
| 7,318,226 B2* | 1/2008 | Chefalas et al. | ............. | 717/171 |
| 7,676,516 B2* | 3/2010 | Boukobza | ................... | 707/713 |
| 7,739,290 B2* | 6/2010 | Rossmann | ................... | 707/755 |
| 7,756,834 B2* | 7/2010 | Masters et al. | ............... | 707/640 |
| 2002/0129053 A1* | 9/2002 | Chan et al. | .................... | 707/503 |
| 2003/0182288 A1* | 9/2003 | O'Connell et al. | ............ | 707/10 |
| 2004/0260695 A1* | 12/2004 | Brill | ............................. | 707/5 |
| 2005/0154716 A1* | 7/2005 | Watson et al. | ................... | 707/3 |
| 2005/0246398 A1* | 11/2005 | Barzilai et al. | ............. | 707/204 |
| 2006/0053168 A1* | 3/2006 | McDougall et al. | ...... | 707/104.1 |
| 2006/0161520 A1* | 7/2006 | Brewer et al. | .................. | 707/3 |
| 2006/0195428 A1* | 8/2006 | Peckover | ....................... | 707/3 |
| 2010/0191702 A1* | 7/2010 | Hofmann | .................... | 707/616 |

OTHER PUBLICATIONS

Person, et al., *Using Word and Excel® in Office 97*, Section 1, Chapter 2, pp. 25-37, QUE Corporation, 1999.

* cited by examiner

*Primary Examiner*—Luke S. Wassum
*Assistant Examiner*—Alexandria Y Bromell
(74) *Attorney, Agent, or Firm*—Kenyon & Kenyon LLP

(57) ABSTRACT

A tool for use in a computer system revises a large set of transaction records, for example hundreds or thousands of records, with a convenient user interface. An operator builds a query for a database to retrieve transaction records. The tool generates temporary copies of the transaction records that are responsive to the query and applies a specified data revision operation to each of the temporary copies. The operator may review and approve the data revision before it is committed to the database system. After receiving approval from an operator, the computer system substitutes the revised temporary copies for the transaction records in the database.

1 Claim, 5 Drawing Sheets

| SEARCH CRITERION 1020 | REPLACEMENT METRIC 1030 | |
|---|---|---|
| PURCH GROUP = 001 | PURCH GROUP = 003 | 1010.1 |
| PURCH GROUP = 003 <AND> DESCRIPTION = 'CLEANING' | PURCH GROUP = 015, DESCRIPTION = Ø | 1010.2 |
| • • • | • • • | |
| DELIVERY DATE = OKT. 2005 | DELIVERY DATE = + 4 WEEKS | 1010.N |

1000

METHOD AND APPARATUS TO SUPPORT MASS CHANGES TO BUSINESS OBJECTS IN AN INTEGRATED COMPUTER SYSTEM

BACKGROUND

The present invention relates to a tool for use in an ordering support system to revise computer records in bulk. Specifically, it relates to a system that permits an operator to filter data records according to a plurality of search parameters, revise the data as needed and review changed data records before integrating them into a data set of a larger system.

Modern businesses use computer networks to manage much of the data that they generate in the ordinary course of their operation. For example, SAP AG and other companies market Supply Relationship Management (SRM) applications, Customer Relationship Management (CRM) applications and other products that assist companies in the purchase and/or sale of products, goods and materials. The SRM application, for example, supports a coordinated network of purchasing agents who are engaged with a company's vendors to issue purchase orders, purchase requests and other conventional business documents. The SRM application creates these documents based on data entered by the purchasing agents at a computer system. The computer system, therefore, maintains data records of these documents which may be useful not only to track the progress of the purchase order itself but also for analytic processes that the company may use to determine if its current business processes are effective. The SRM application has tools to manage these analytic processes as well.

Similarly, a CRM application may be used by a company's sales force to record sales transactions, to generate sales documents and to perform analytic functions on data representing these sales. In this regard, the operation of such applications is well known.

Companies require applications to adapt to changing corporate structures. A team of purchasing agents, for example, is not static. Agents may be added to or dropped from the team over time. The team itself may expand or contract over time in response to a host of different factors. It is not always possible to foresee, when a new data record is created in a business application, whether the information in those data records will remain constant against dynamic forces that the company attempts to handle.

Large business organizations can create hundreds of thousands or even millions of business documents per year. They may manage teams of hundreds of agents across their corporate infrastructure. When such an organization must revise a base of transaction records in their business applications, it can be an awkward, time-consuming and error prone process to revise these records individually. Accordingly, the inventors perceive a need in the art for a computer system that permits an operator to perform a common revision to business objects in bulk.

BRIEF DESCRIPTION OF THE DRAWINGS

FIGS. 3-8 are screen shots of an exemplary computer system operating according to an embodiment of the present invention.

DETAILED DESCRIPTION

The present invention provides a tool for use in a computer system that conveniently revises a large set of transaction records, for example hundreds or thousands of records, with a convenient user interface. According to the invention, an operator queries a database for transaction records. The tool generates temporary copies of the transaction records that are responsive to the query and applies a specified data revision operation to each of the temporary copies. The operator may review and approve the data revision before it is committed to the database system. After receiving approval from an operator, the computer system substitutes the revised temporary copies for the transaction records in the database.

Figure 1:
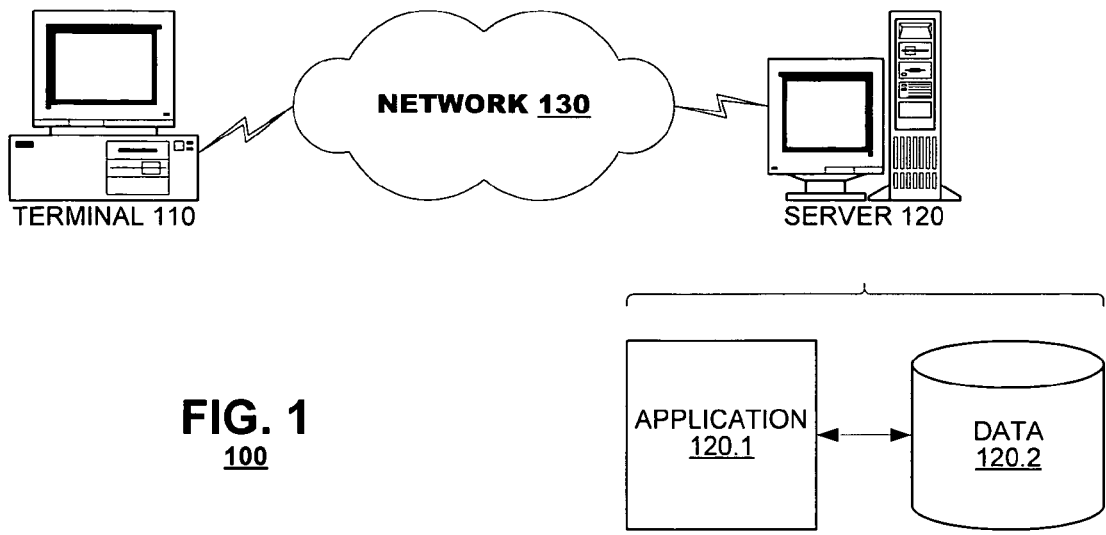
FIG. 1 is a block diagram of a computer system according to an embodiment of the present invention.

FIG. 1 is a simplified block diagram of a computer system 100 according to an embodiment of the present invention. There, the computer system 100 is shown as including a terminal 110, a server 120 and an interconnecting network 130. The server 120 may execute a business application and maintain a database of transaction records generated in the ordinary course of a company's business. The terminal 110 provides operator access to the application and data records. Execution of the business application may occur solely on a terminal 110, solely on the server 120 or share resources of the terminal 110 and server 120 as needs dictate. Such implementation decisions are immaterial to the present discussion unless noted.

Although only one terminal 110 and one server 120 are illustrated in FIG. 1, modern businesses typically maintain computer networks 100 with several terminals and servers. The topology and architecture of the computer system 100 also is immaterial to the present discussion unless noted. For the purposes of the present discussion, it is sufficient that the computer system 100 stores transaction records generated pursuant to execution of a business application and interaction therewith, and that the system permits operators (not shown) to create, review and revise transaction records as discussed herein.

Figure 2:
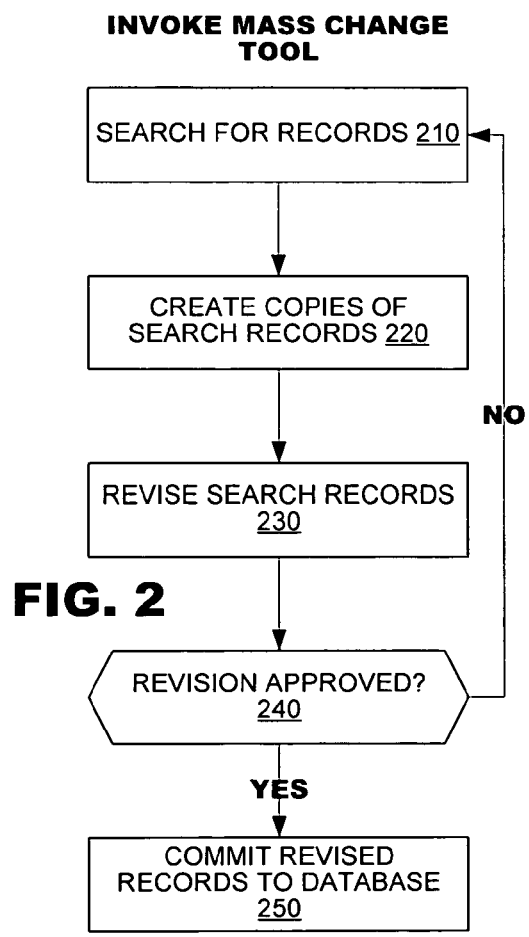
FIG. 2 is a flow diagram of a method according to an embodiment of the present invention.

FIG. 2 illustrates a method 200 according to an embodiment of the present invention to permit bulk revision of transaction records. The method may be invoked by operator command. In a first stage of the method, an operator may select transaction records according to a record search (box 210). The search may be iterative; that is, an operator may search and retrieve a first set of document through a general search and then repeatedly refine the search through successive, narrower searches until the operator is satisfied with the search results generated thereby. The system generates temporary copies of the transaction records uncovered by the search and applies the data revisions to the copies (box 220). Thereafter, the operator may specify revisions that are to be applied globally to all transaction records in the search results (box 230). The method thereafter presents the revised data records to the operator for review and approval (box 240). If the operator approves the revisions as applied to the copies, the system commits the changes to the computer system's database (box 250). If operator does not approve the changes, however, the process returns to box 210 to permit the operator to repeat operation and enter a new set of revisions. Thus, the method permits an operator to review revisions before they are committed to the application.

FIGS. 3-8 provide screenshots of a software tool that executes bulk revision of transaction records according to an embodiment of the present invention. In this example, an operator works with an SRM application to reassign purchase requests from one purchasing group to another purchasing group.

Figure 3:
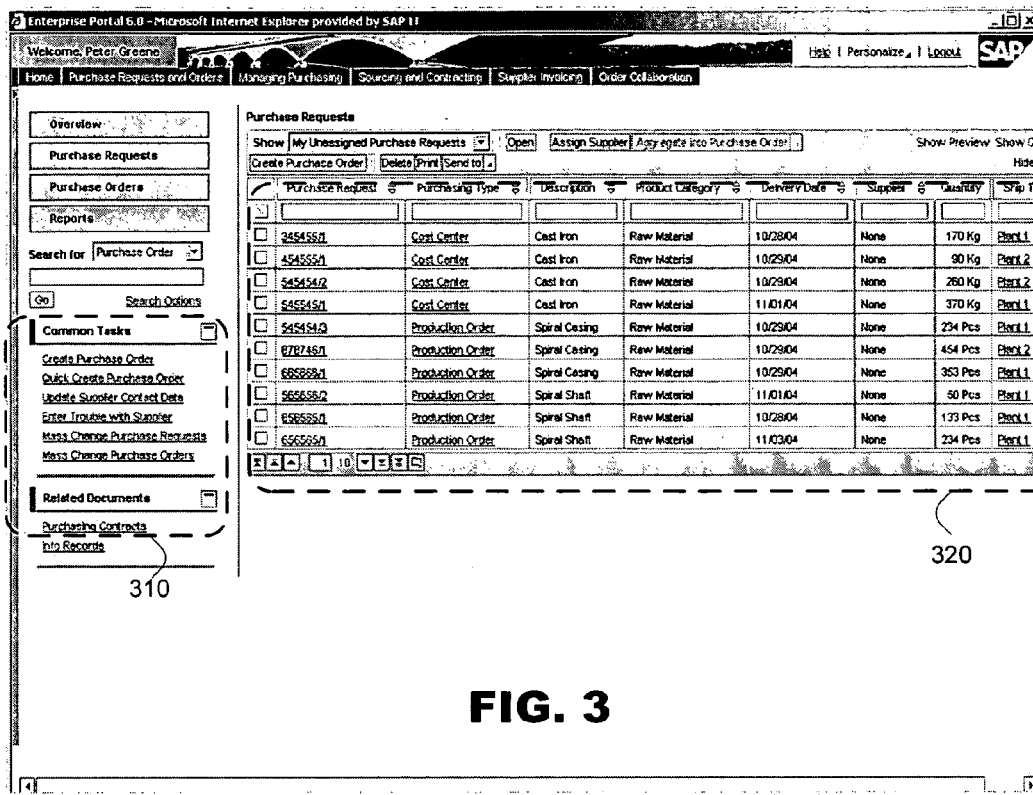

FIG. 3 illustrates a user interface 300 that may be presented to an operator before the change operation is invoked. The user interface may include a taskbar 310, which permits the operator to invoke various application features, including the bulk change feature of the present invention (labeled "mass change purchase requests" and "mass change purchase orders" in FIG. 3). The user interface 300 also may include a frame 320 for display of transaction records. As can be seen in FIG. 3, transaction record data typically includes a plurality of fields that permit a business to classify the records along predetermined parameters.

Figure 4:
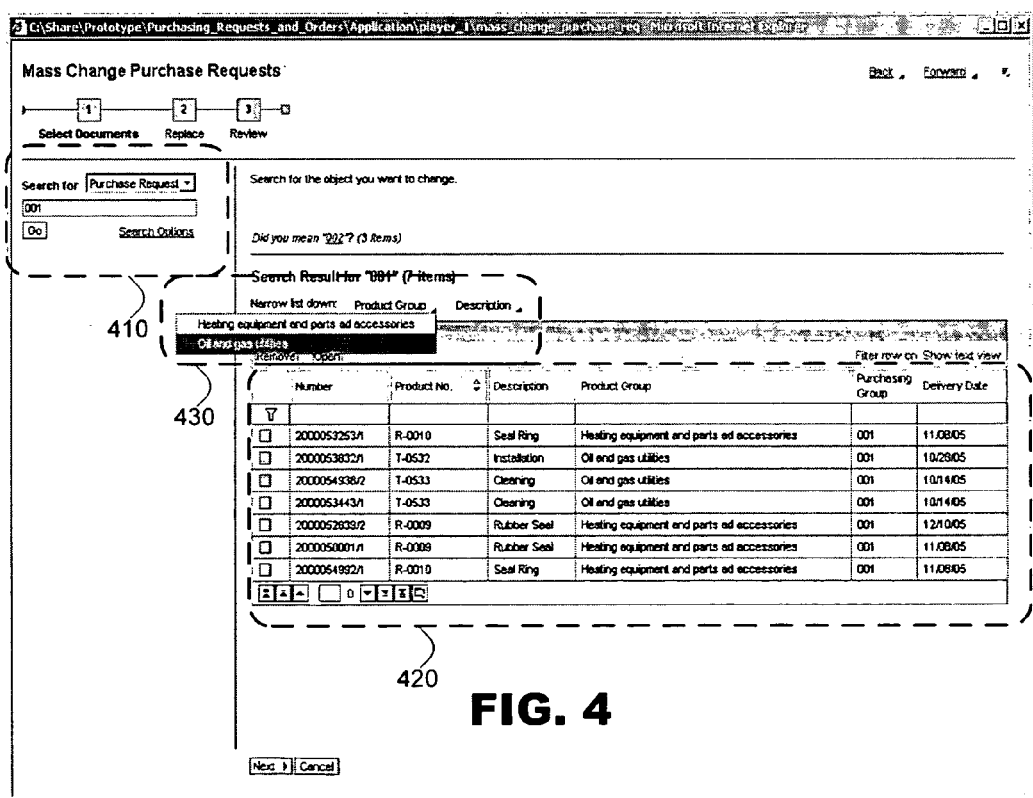

FIG. 4 illustrates another user interface 400 that may be provided to permit operators to select transaction records for modification. The user interface may include a search window 410 that permits an operator to specify search terms for a database query. The search window may permit the operator to restrict the search to select field(s) of the transaction records. It also supports Boolean combinations of search terms (through an interface not shown). Search results, once collected, may be displayed in a frame 420. The system may survey the collected transaction records and cluster them according to various parameters such as record fields. In so doing, the system may propose additional search terms on which to narrow the search results. An exemplary set of proposals are shown in the pull down menus 430 of FIG. 4.

Figures 5, 6:
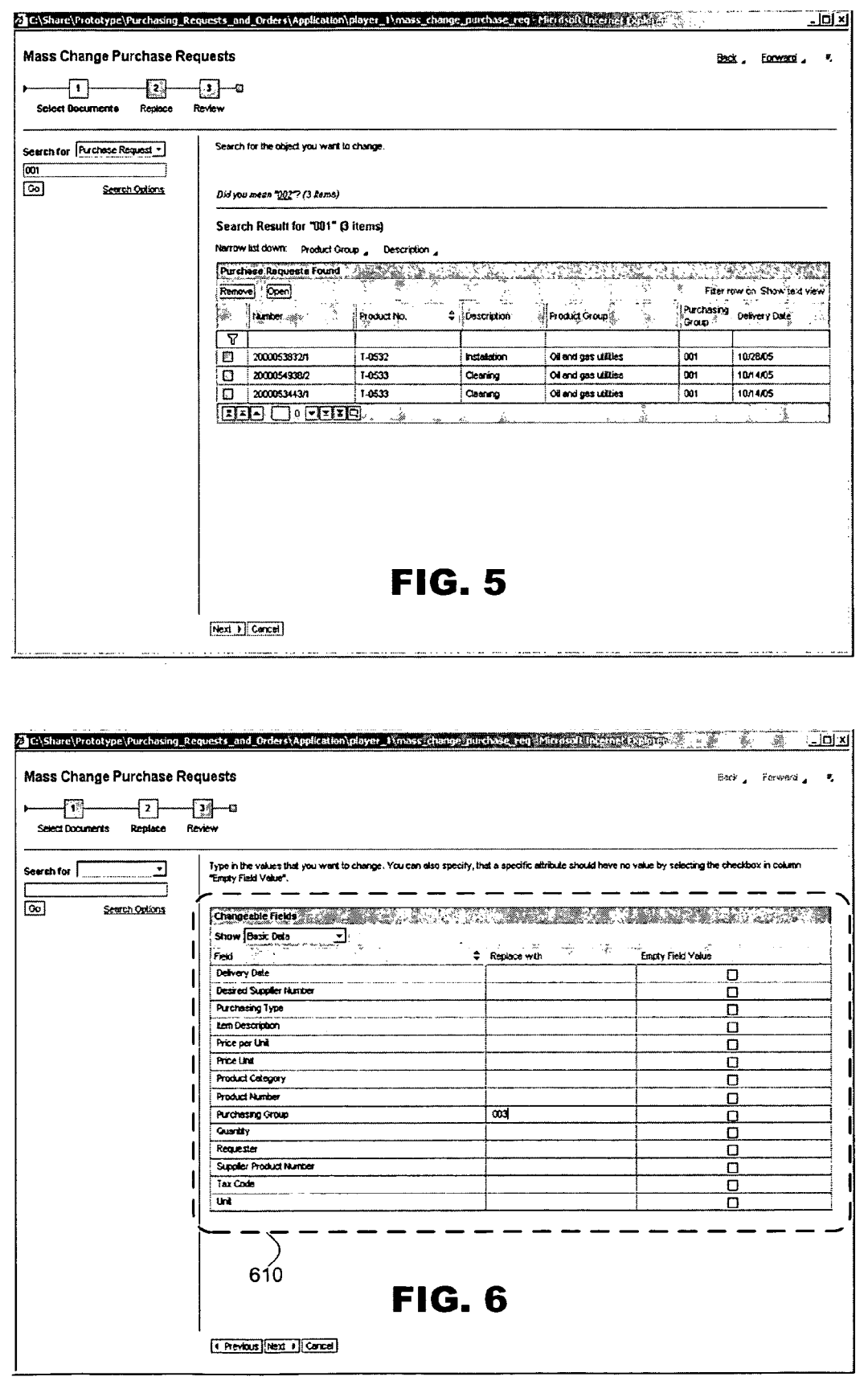

FIG. 5 illustrates an exemplary set of final search results obtained through combination of the search conditions of FIG. 4.

FIG. 6 illustrates a user interface that permits an operator to enter revisions according to an embodiment of the present invention. In FIG. 6, a window 610 lists a plurality of fields for the transaction records. A "replace with" column permits operators to enter new data, which will be applied to each of the transaction records uncovered by the prior search. An "empty field value" column permits an operator to specify that a corresponding field should be left blank in all the transaction records.

Figure 7:
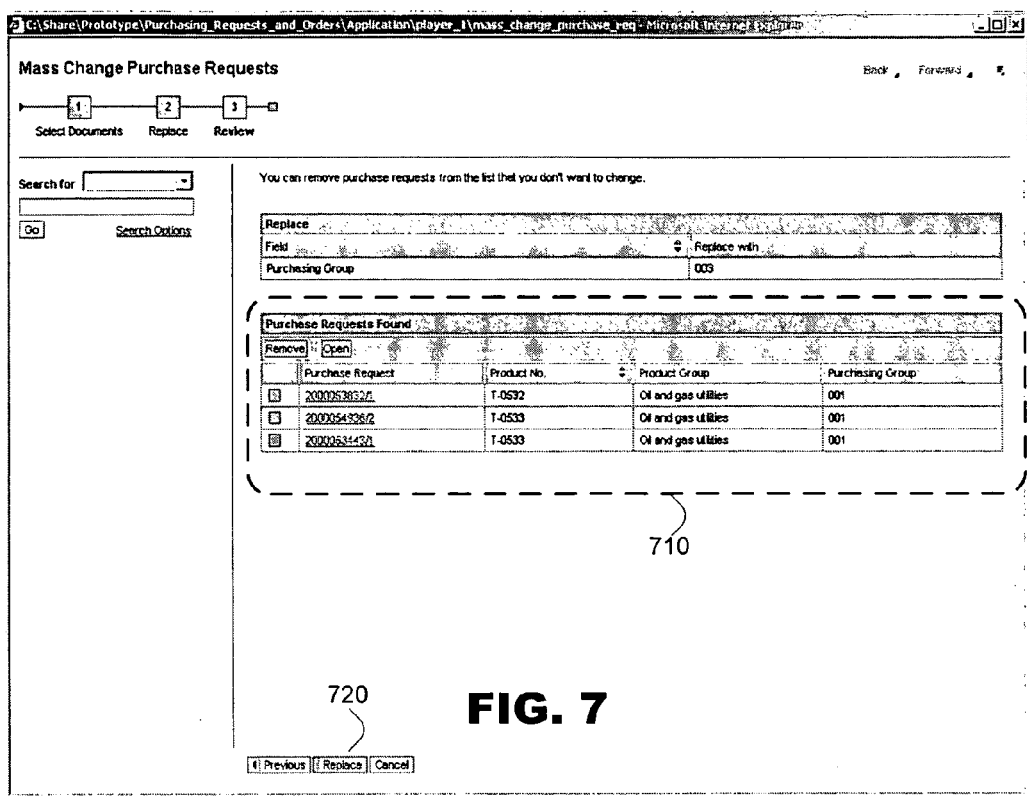

FIG. 7 illustrates a user interface that presents revised transaction records for review and approval. The user interface includes a frame 710 that presents the revised records. A user may open individual records for detailed review. After approval, an operator commands the system to substitute the revised records for the original transaction records (by, for example, clicking on a "replace" button 720). Thereafter, the data revisions are committed to the database.

Figure 8:
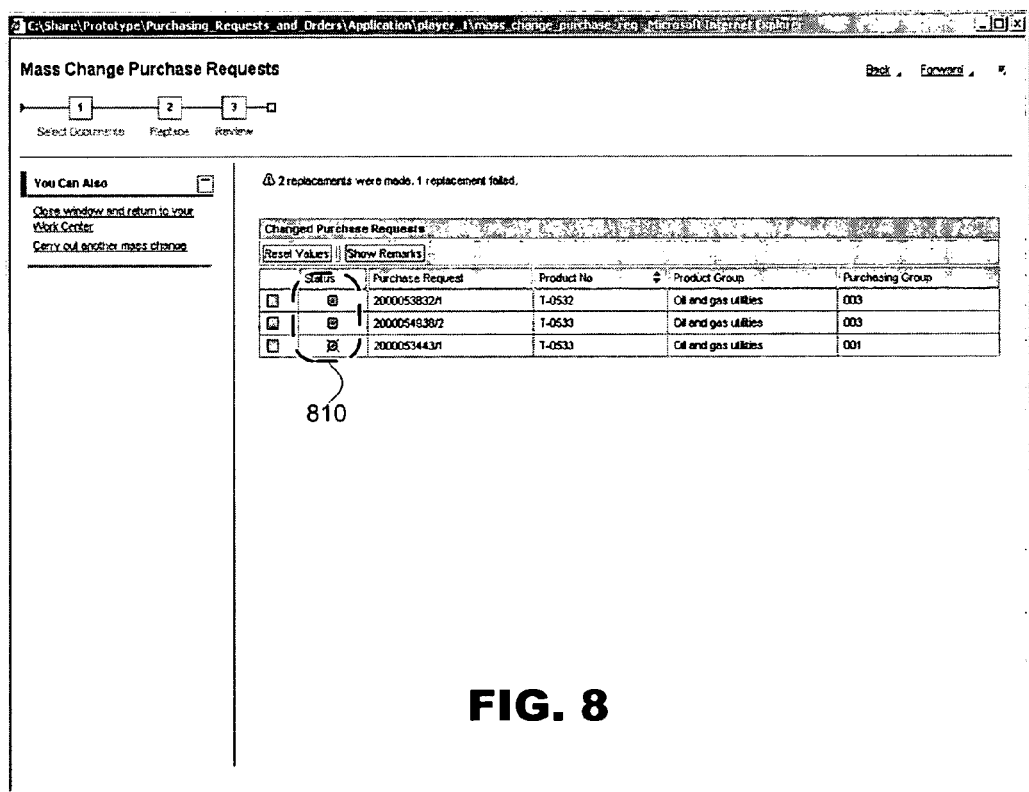

FIG. 8 illustrates a screen shot illustrating the results of the attempted data revision. Status buttons 810 indicate whether the data revisions were committed to the database and advise an operator of any problems. For example, a status button corresponding to purchase request 2000053443/1 indicates a problem. For example, a sharing violation may have occurred if another operator had opened and was working with the transaction record when the mass change operation was attempted. According to an embodiment of the present invention, the system may prompt the operator to reschedule the update operation on any transaction records for which an update failed on a prior attempt.

Figures 9, 10:
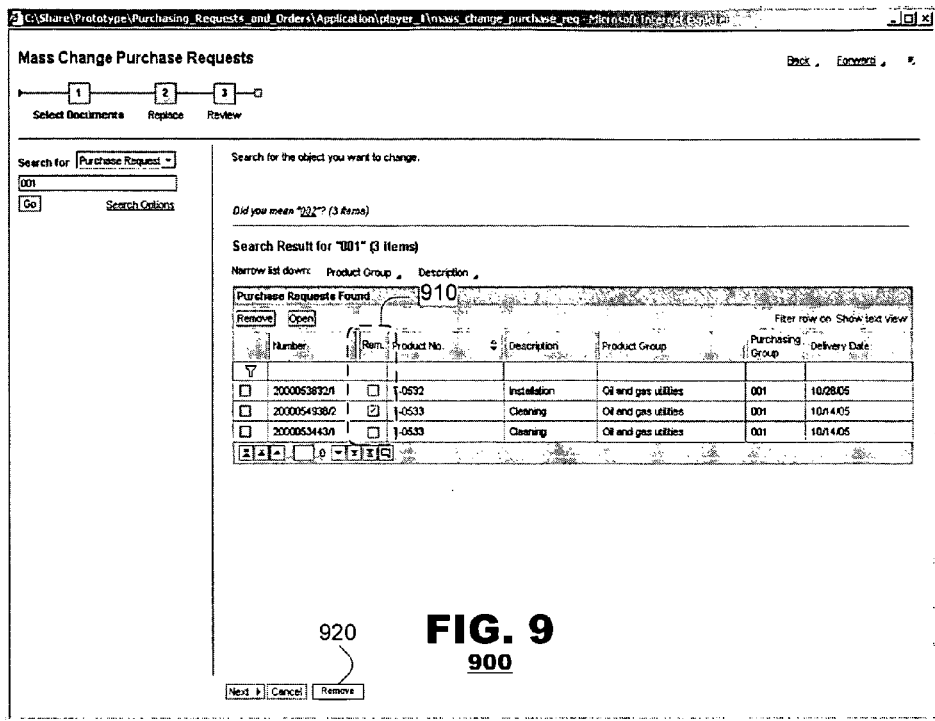
FIG. 9 is a screen shot according to an alternate embodiment of the present invention.
FIG. 10 illustrates replacement rules according to an embodiment of the present invention.

Embodiments of the invention may be extended to provide additional refinements to the search process. For example, in one embodiment, a user interface may include additional elements that permit an operator to select individual records from within search results for inclusion or exclusion to the bulk records change. Referring to FIG. 9, the user interface may include check boxes 910, for example, to permit an operator to remove individual records from search results. Once check boxes are selected and a remove command is entered via button 920 or, alternatively, through a context-specific menu (not shown) that may be opened by right clicking upon a select record, the records may be filtered from the search results. Another, narrower set of search results are presented to the operator, which may be operated upon as described above.

Similar check boxes may be provided to permit an operator to specify that an operation is performed directly upon select records in advance of the bulk update. In this manner, an operator may prioritize an update operation to individual records before simulating and applying the update upon a large set of records.

The foregoing screen shots illustrate an embodiment where the mass change operation is invoked by a terminal connected to an application via a portal-based communication network. The user interfaces therein are shown as displayed via a browser. Of course, application of the present invention is not so limited. The techniques of the present invention may be performed via an application executing directly on a client terminal, for example, and generating a dedicated user interface if appropriate.

Thus, the present invention provides a tool that permits an operator to enter updates to transaction records in bulk, where individual modification of records would be administratively expensive. By way of example, this tool finds application in business management software applications in several use scenarios, such as:

where corporate reorganizations or corporate additions reallocate responsibility for transactions among departmental personnel (e.g., departments are reorganized or personnel either are added to or removed from departments);

where new corporate policies are invoked which remap transaction records among corporate groups or departments, to correct data entry errors or corporate policy errors which caused common errors among transaction records and which can be corrected by a rule-based remapping of transaction records.

Of course, these use scenarios are not exhaustive. The present invention finds application in any data correction scenario in which fields from stored records are remapped in a rule-oriented manner.

FIG. 10 illustrates another embodiment of the present invention that is suitable for multiple data update scenarios. In this embodiment, an operator may use the user interface to define several data correction rules 1010.1-1010.N to occur on a common data set. Each rule defines a search criterion 1020 and a replacement metric 1030. As illustrated in FIG. 10, the search criterion 1020 may be defined as single field searches or multiple field searches defined according to Boolean operators. The replacement metric 1030 fields also may be defined as single field replacements or multi-field corrections. In the example of FIG. 10, record 1010.2 identifies that the DESCRIPTION field should be cleared (represented by a null operator).

Additionally, record 1010.N indicates that a date field is incremented by a mathematical operation (e.g., advanced by four weeks). This embodiment may be particularly convenient for operators because it permits an operator to define several replacement metrics before performing a single simulation upon the data set.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. An entity relationship management data correction tool for revising and replacing data records of a data set accessible by different computer applications, comprising:

a processor;

a display device for presenting a graphical user interface;

a storage device connected to a processor for storing in a relationship database data replaced with a replacement metric, the relationship database storing data records related to an entity's relationships; and a processor executing instructions according to a relationship management application, the instructions causing the processor to correct data transaction records managed by the relationship management application comprising:

applying a data correction rule to data records in the relationship database, the data correction rule defining a search criterion and a replacement metric, the replacement metric being data to replace data stored in the relationship database;

in response to the application of the data correction rule, searching the relationship database using the search criterion from the data correction rule for data records that contain data that matches the search criterion;

upon identifying data matching the search criterion in the data correction rule, generating temporary copies of the data records with matching data;

presenting in the graphical user interface the temporary copies in a search results panel of the graphical user interface and, in a revised records panel of the graphical user interface, presenting data records incorporating the replacement metric included in the data correction rule to form replacement data that will replace the matching data in the data records; and in response to an approval input to the graphical user interface, committing the data records incorporating the replacement metric presented in the revised records panel of the graphical user interface to the data record stored in the relationship database that had the matching data, wherein the graphical user interface comprises a revised records panel for display of revised data records to be obtained by global application of the replacement metric upon the data records presented in a search results panel during execution of a data revision operation, wherein the revised records panel includes a user control to select and remove data records from the data replacement operation and a user control to commit revised data records containing the replacement metric to the data records.

* * * * *